United States Patent
Pagilla et al.

(10) Patent No.: US 8,324,604 B2
(45) Date of Patent: Dec. 4, 2012

(54) FIBER OPTIC WEB EDGE SENSOR

(75) Inventors: Prabhakar R. Pagilla, Stillwater, OK (US); Aravind Seshadri, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 888 days.

(21) Appl. No.: 11/937,125

(22) Filed: Nov. 8, 2007

(65) Prior Publication Data
US 2011/0001067 A1 Jan. 6, 2011

Related U.S. Application Data

(60) Provisional application No. 60/865,000, filed on Nov. 9, 2006.

(51) Int. Cl.
*G01N 21/86* (2006.01)
*G01B 11/14* (2006.01)
(52) U.S. Cl. ............... 250/559.36; 250/559.29; 356/622
(58) Field of Classification Search .............. 250/559.29, 250/559.36, 216, 227.11; 356/615, 622
See application file for complete search history.

(56) References Cited

U.S. PATENT DOCUMENTS

| | | | | |
|---|---|---|---|---|
| 4,049,349 | A | * | 9/1977 | Wennerstrom ............... 356/4.07 |
| 4,080,242 | A | * | 3/1978 | Komenda et al. ............. 156/506 |
| 4,092,068 | A | * | 5/1978 | Lucas et al. ..................... 356/73 |
| 5,021,674 | A | * | 6/1991 | Brunner ................... 250/559.36 |
| 5,331,152 | A | | 7/1994 | Fenton |
| 5,346,049 | A | * | 9/1994 | Nakajima et al. ............. 194/328 |
| 5,405,470 | A | * | 4/1995 | Held .............................. 156/159 |
| 5,570,186 | A | * | 10/1996 | Satzger et al. ................. 356/613 |
| 6,005,683 | A | | 12/1999 | Son et al. |
| 6,151,117 | A | * | 11/2000 | Tuhro et al. .................... 356/615 |
| 6,566,670 | B1 | * | 5/2003 | Buisker et al. ............ 250/559.36 |
| 7,449,708 | B2 | * | 11/2008 | Jeong et al. .............. 250/559.36 |
| 2003/0063294 | A1 | * | 4/2003 | Medberry et al. ............ 356/615 |

FOREIGN PATENT DOCUMENTS

GB 1479603 A * 7/1977
WO PCT/US2007/84136 11/2007

OTHER PUBLICATIONS

Agrawal, Govind P., "Fiber-Optic Communication Systems", 2002, vol. 3rd Edition, Publisher: John Wiley & Sons, Inc.
Gronquist, D., "Sensors and Signal Processing an Optical Edge Sensor for Transparent Film Applications", "Proceedings of the First International Conference on Web Handling", 1991.
Haque, M. et al., "Linear Edge Sensor", "Proceedings of the Fifth International Conference on Web Handling", 1999.
Haque, M. et al., "Linear Image Detector-Based Edge Scan Sensor", "Proceedings of the Sixth International Conference on Web Handling", 2001.

(Continued)

*Primary Examiner* — Thanh Luu
(74) *Attorney, Agent, or Firm* — Fellers, Snider, Blankenship, Bailey & Tippens, P.C.

(57) ABSTRACT

A web edge sensor is disclosed. The web edge sensor has a light source directing light incident to an edge of a web. The edge of the web scatters the light and a sensor array that detects a first portion of the light scattered from the edge of the web and rejects a second portion to determine a position of the web edge.

18 Claims, 10 Drawing Sheets

OTHER PUBLICATIONS

Udd, Eric, "Fiber Optic Sensors: An Introduction for Engineers and Scientists", 1991, Publisher: John Wiley & Sons, Inc.

Johnson, et al., "One-and two-dimensional, differential, reflective fiber displacement sensors", "Applied Optics", Aug. 1, 1985, pp. 2369-2372, vol. 24, No. 15, Publisher: Optical Society of America, Published in: United States.

Seshadri, et al., "A novel edge sensor for web guiding", "Sensors and Smart Structures Technologies for Civil, Mechanical, and Aerospace Systems", 2006, pp. 1-12, vol. 6174, Publisher: Smart Structures and Materials, Published in: United States.

TAOS, "TSL201R 64×1 Linear Sensor Array", TAOS (Texas Advanced Optoelectronic Solutions), Dec. 2005, pp. 1-8, Publisher: The Lumenology Company, Published in: United States.

* cited by examiner

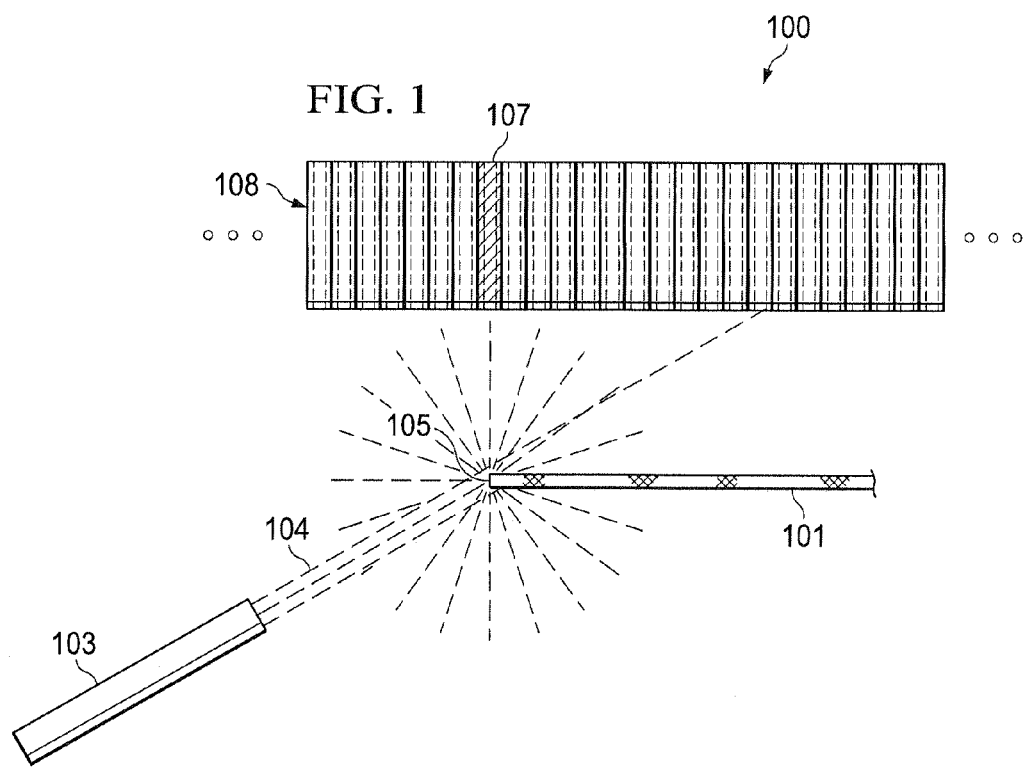
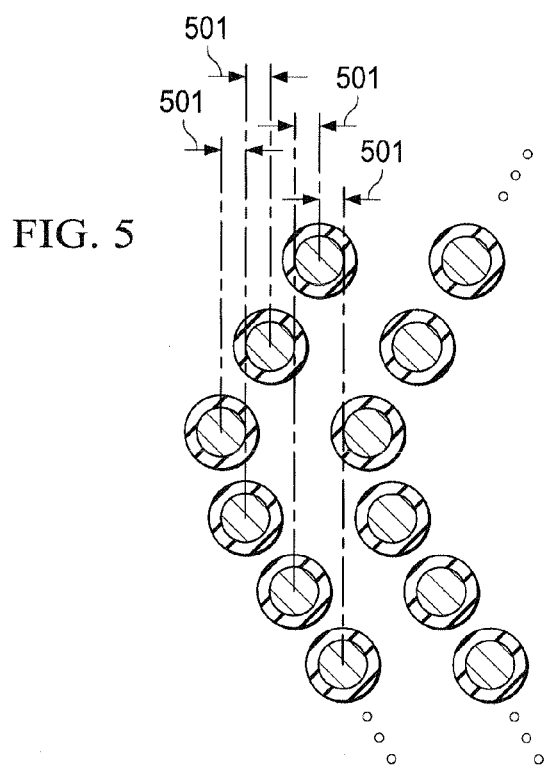

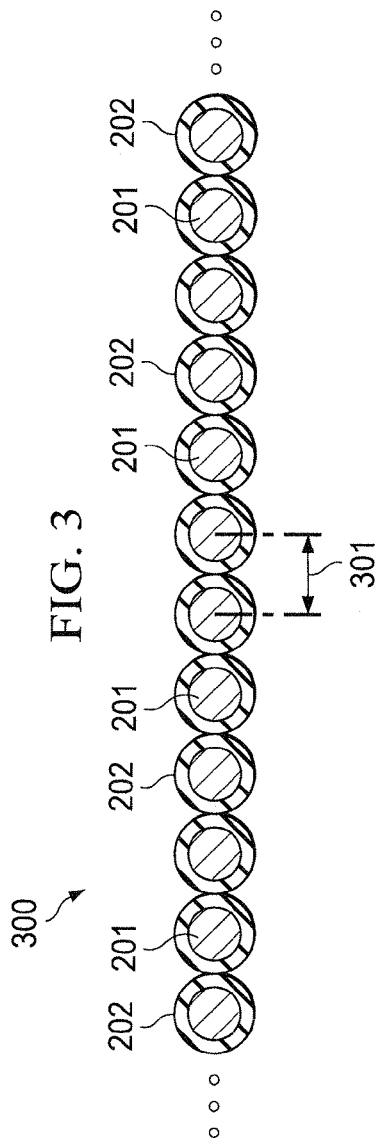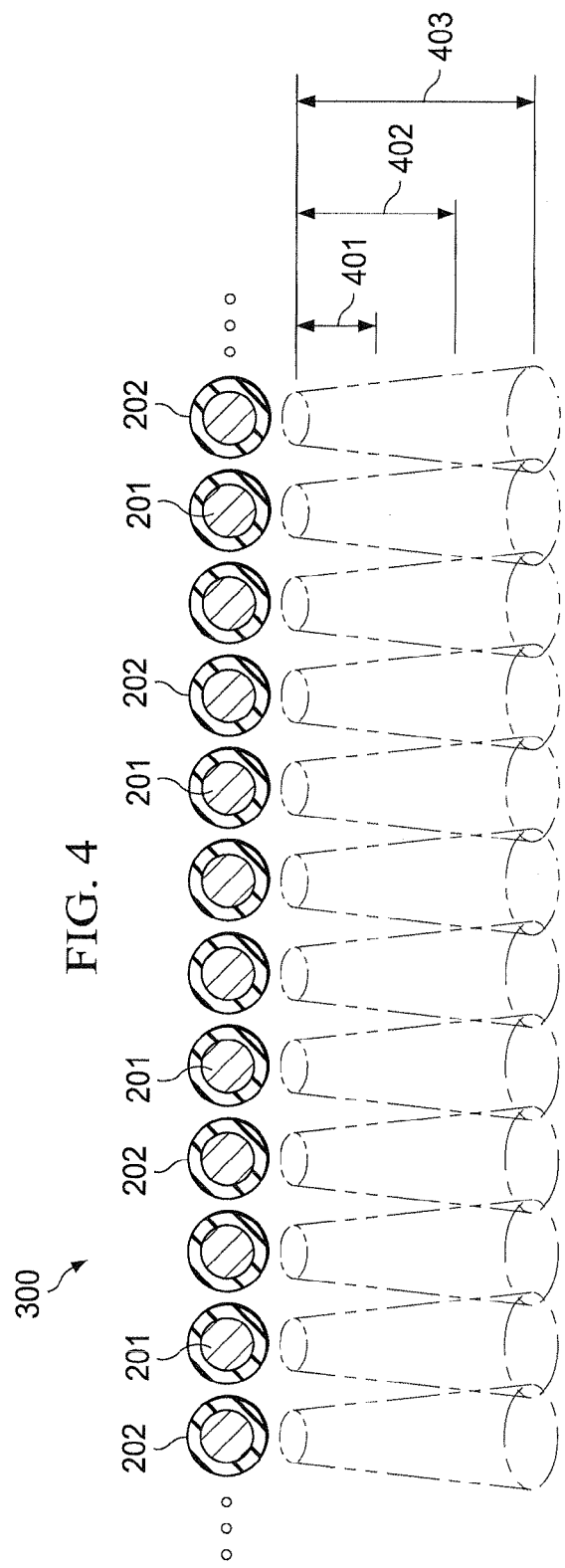

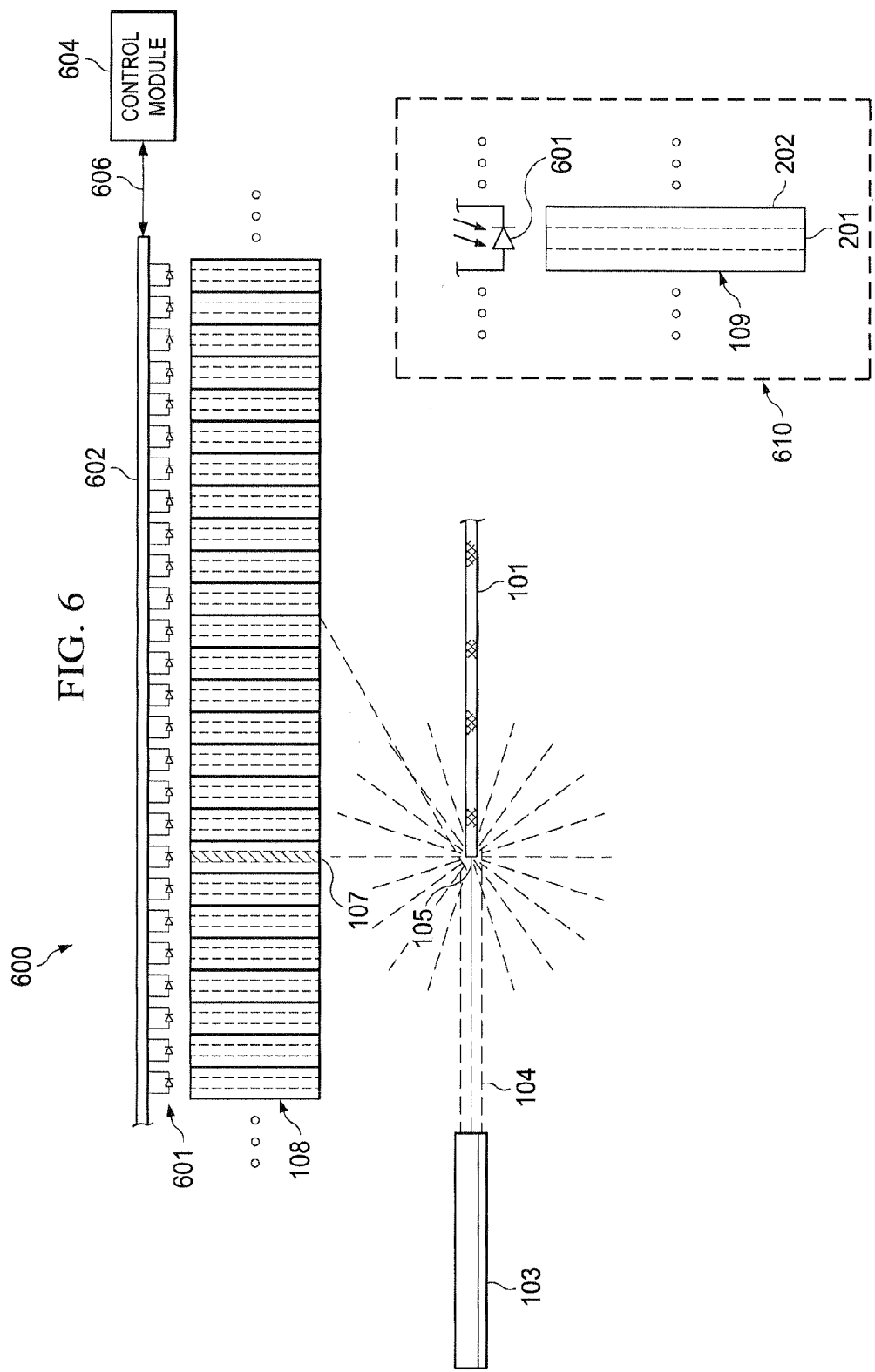

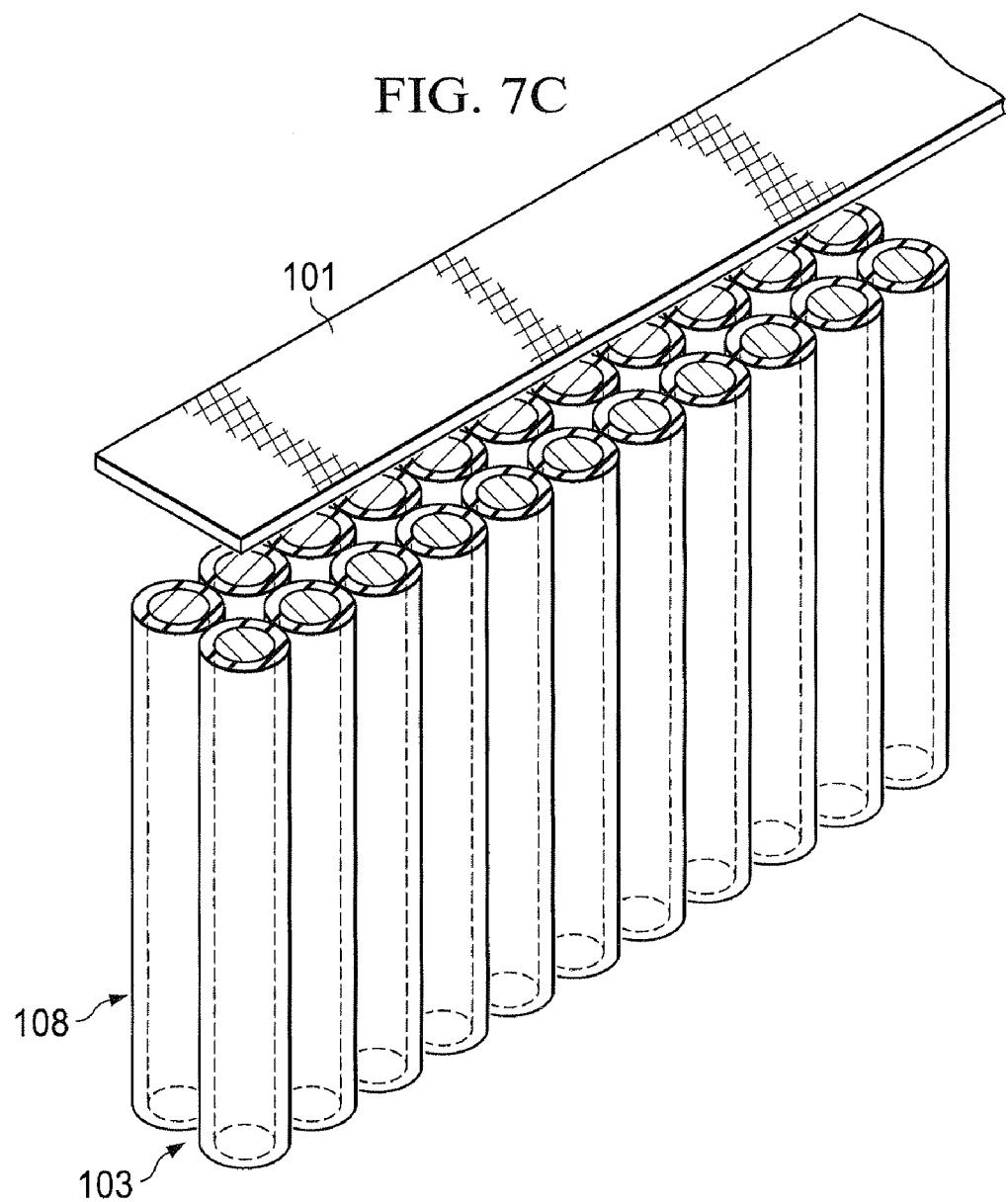

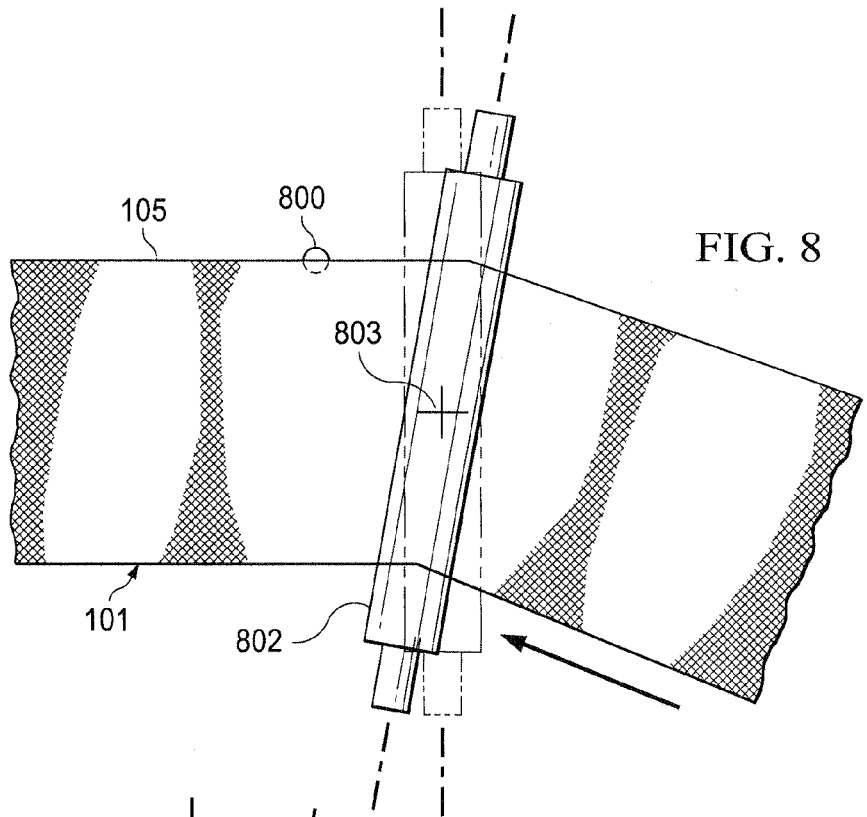
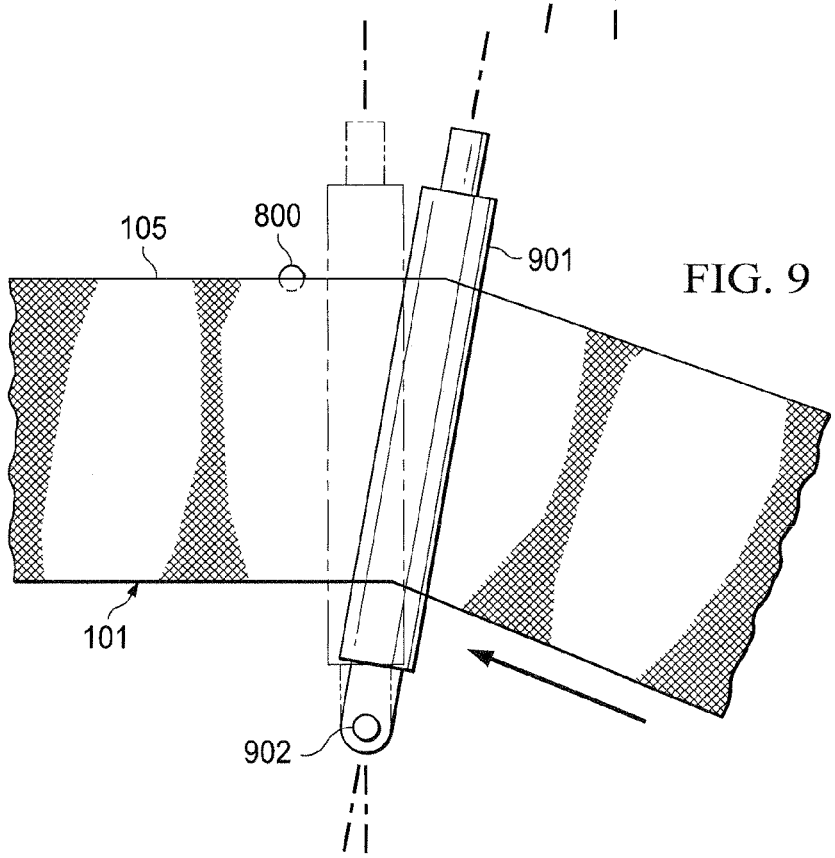

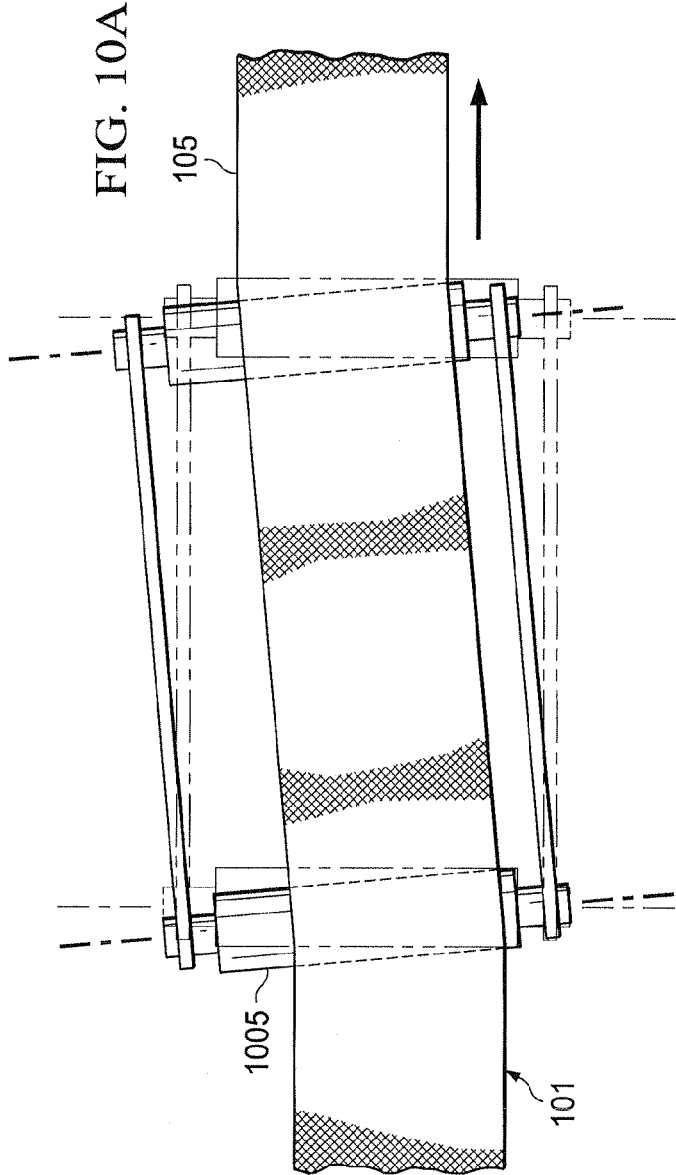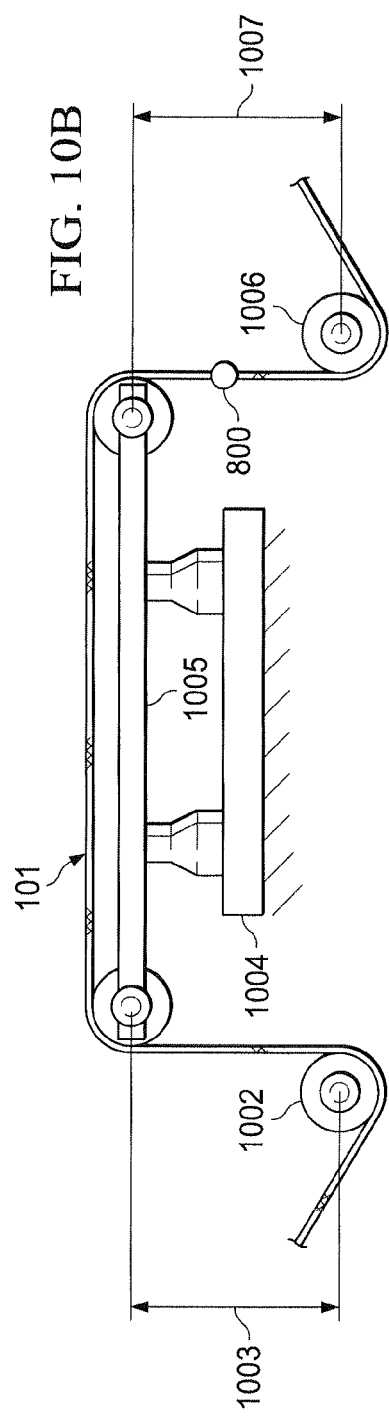

FIBER OPTIC WEB EDGE SENSOR

CROSS REFERENCE TO RELATED APPLICATIONS

This application claims the benefit of prior filed U.S. Provisional Patent Application No. 60/865,000 entitled "FIBER OPTIC WEB EDGE SENSOR," filed Nov. 9, 2006, the contents of which are hereby incorporated by reference.

STATEMENT REGARDING FEDERALLY SPONSORED RESEARCH OR DEVELOPMENT

This invention was made with government support under contract CMS 0428397 awarded by the National Science Foundation. The government has certain rights in the invention.

FIELD OF THE INVENTION

The present invention is related to object position sensors in general and, more particularly, to position sensors for locating flexible web materials.

BACKGROUND

The term web is used to describe materials which are manufactured and processed in a continuous, flexible strip form. Web materials cover a broad spectrum from extremely thin plastics to paper, textiles, metals, and composites. Web handling refers to the physical processes related to the transport and control of web materials through processing machinery. Web handling systems facilitate transport of the web while it is being processed in processing machinery, which is typically an operation specific to the particular web product. For example, in the case of webs used for consumer products, the web is coated, printed, or laminated. A typical operation involves transporting a web in rolled, unfinished form from an unwind roll to a rewind roll through processing machinery where the required processing operations are performed. The web is transported by rollers driven by motors in a process line. The quality of the finished web depends on how it is handled on the rollers during transport. Lateral and longitudinal motion of the web, and web tension, are controlled during transport.

Accurate web guiding is becoming increasingly demanding due to variation in web materials, both in the gauge and opacity of the materials, being processed in a single process line. Since web lateral position is used as feedback for controlling a web guide, accurate web edge detection becomes increasingly important for proper guiding of the web. Web lateral position is defined generally to mean the position of the center and edges of the web relative to a fixed position on the axis of rotation of the roller along the axis of rotation of the roller. This axis of rotation of the roller is generally perpendicular to the direction of travel of the web.

What is needed is a system and method for addressing the above, and related, issues.

SUMMARY OF THE INVENTION

The present invention disclosed and claimed herein, in one aspect thereof, comprises a web edge sensor. The web edge sensor has a light source directing light incident to an edge of a web. The edge of the web scatters the light and a sensor array that detects a first portion of the light scattered from the edge of the web and rejects a second portion to determine a position of the web edge.

In various embodiments the sensor array comprise a plurality of fiber optic strands that may be jacketed. The sensor array may be a linearly arranged plurality of fiber optic strands or may comprise a two dimensional array. Photodiodes may be connected to the fiber optic strands. The sensor array may be positioned to detect web flutter and/or lateral movement of the web

BRIEF DESCRIPTION OF THE DRAWINGS

FIG. 1 is a schematic illustration of one embodiment a web edge sensor according to aspects of the present disclosure.

FIG. 3 is an end view of a linear array of optical fibers.

FIG. 4 is an illustration of the cone of acceptance principle for an exemplary fiber optic array.

FIG. 5 is an end view of a two dimensional array of optical fibers

FIG. 6 illustrates the illumination of a single optical fiber due to scattered light from a web edge.

FIG. 7C is a perspective view of the operation of the sensor array of FIG. 7A.

FIG. 8 is a top down view of a center pivot guide roller.

FIG. 9 is a top down view of an end pivot guide roller.

FIG. 10A is a top down view of an offset pivot guide roller.

FIG. 10B is a side view of an offset pivot guide roller.

DETAILED DESCRIPTION OF THE PREFERRED EMBODIMENT

Figure 2:
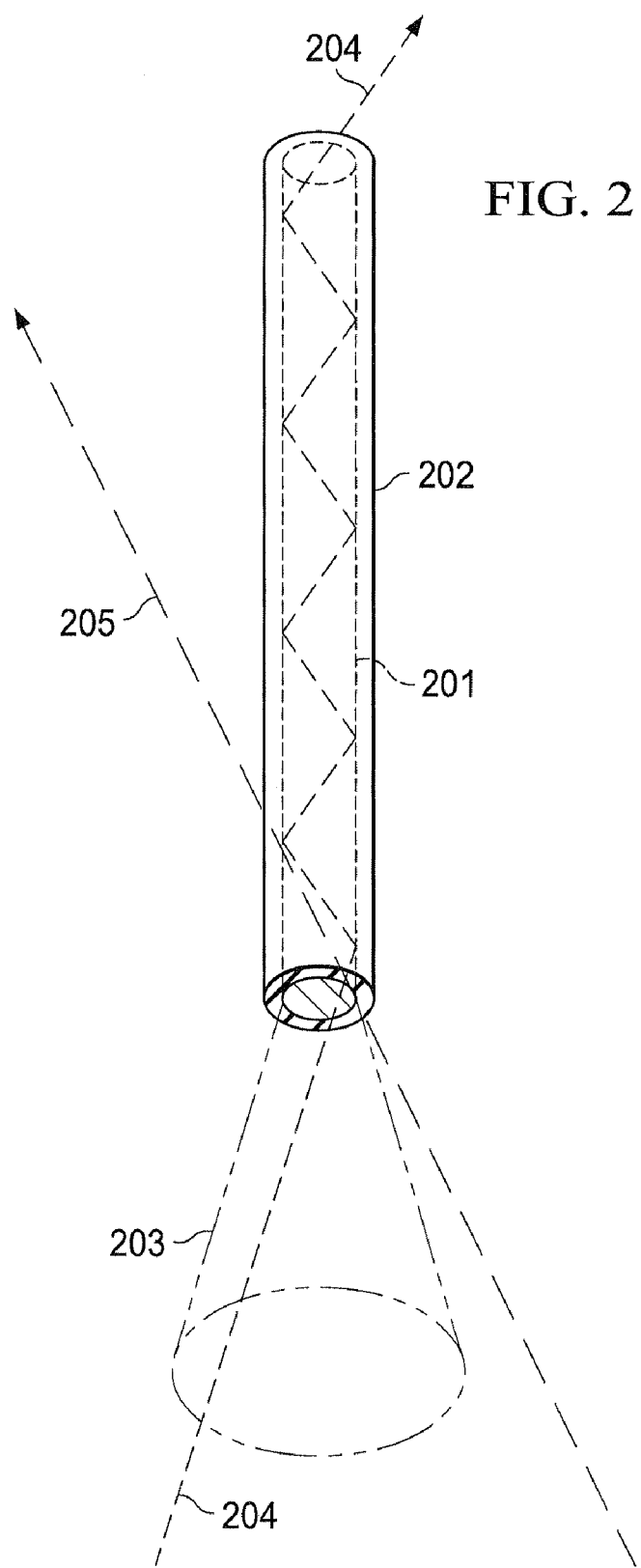
FIG. 2 is a schematic illustration of the cone of acceptance principle for an optical fiber.

Referring now to FIG. 1, a schematic illustration of one embodiment of a web edge sensor according to aspects of the present disclosure is shown. In the present embodiment, the web edge sensor is a fiber optic web edge sensor comprised of a laser light source 103, a one-dimensional or two-dimensional array of optical fibers 108, and a means for detecting the illumination of the optical fiber or fibers at the distal end of the optical fibers from the sensor end of the optical fibers.

Solid materials, when illuminated by light, scatter incident light in all directions. In the present embodiment, a laser source 103 generates a laser light beam or laser curtain 104 that is incident on the web edge 105 of the web 101. The laser curtain 104 can be inclined at substantially any angle to the plane of the web 101. Although the present embodiments discussed herein contemplate a laser light source, the light source 103 could be any monochromatic collimated light source.

The web edge 105 intercepts the incident laser curtain 104 and scatters light in all directions. Regardless of the opacity of the web 101, scattering of light takes place. Scattered light from the web edge 104 may be collected by an optical fiber array 108. The fiber optic array 102 may be positioned such that the ends of the optical fibers are essentially parallel to the plane of the web 101.

Referring now to FIG. 2, a schematic illustration of the cone of acceptance principle for an optical fiber is shown. Optical fibers are directionally sensitive. This means that light must strike the end of the optical fiber within a specific range of angles (e.g., less than a critical angle) in order for the fiber to be illuminated. The critical angle depends on the numerical aperture (NA) of the fiber, which is given by $NA=\sin(\theta_c)$, where $\theta_c$ is the critical angle of incidence above which no light is transmitted.

Based on the core diameter and NA of an optical fiber, there is an invisible cone 203 which extends from the core 201. The volume of the cone increases as distance from the core increases. An exemplary ray of light 204 traveling within the cone 203 that is incident on the fiber is transmitted into the fiber. An exemplary ray of light 205 outside of the cone 203 will not be transmitted by the fiber. This property of increasing the volume of the cone can be effectively used to make sure only one or a few fibers are illuminated by the scattered light from the web edge into the fibers. By moving the array 108 closer to the scattering material, the cone 203 can be made smaller and restrict the potential amount of light rays that will be transmitted. Conversely, moving the array 108 farther from the scattering source will increase the number of rays of scattered light transmitted.

In the present embodiment, the optical fibers are made of a core 201 and a cladding 202. Light may be transmitted through the core 201 while the cladding 202 protects the core 201 and serves to aid in the internal reflection of the light within the core 201. Light rays 204 with angles of incidence less than the critical angle suffer total internal reflection, and hence, are transmitted inside the core 201 of the fiber. Light rays 205 with angle of incidence greater than the critical angle are not internally reflected and are not transmitted.

Referring now back to FIG. 1, in the embodiment illustrated, a single fiber 107 is illuminated by the scattered light whose angle of incidence is less than the critical angle. This single illuminated fiber 107 can be any one of the fibers in the linear or two-dimensional array. All fibers receive some scattered light, but based on the angle of incidence only one or a few fibers are illuminated. Light entering the optical fiber 107 illuminated by the reflected light from the web may be detected by a photodiode or other detection means (not shown) on an end of the optical fiber opposite the web 101. Because the sensors of the present disclosure utilize discrete fiber optic strands and photodiodes to detect position, calibration may not be necessary.

Referring now to FIG. 3, an end view of a linear array of optical fibers is shown. This linear array of fibers 300 may be used to detect the scattered light as shown in FIG. 1. The spacing 301 between the individual fibers in the linear array 300 determine resolution of the array 300. As the spacing 301 is decreased, the resolution is increased.

Referring now to FIG. 4 an illustration of the cone of acceptance principle for an exemplary fiber optic array is shown. The distance of the fiber ends from the scattering source at least partially determines how may scattered rays are captured. If scattered light is generated at a distance close to the fiber ends 401, some scattered light rays may fall between the cones of acceptance from neighboring fibers. At distances far from the fiber ends 403, the cones of acceptance overlap so multiple fibers may be illuminated. There is an optimal distance 402 at which the cones of acceptance intersect so that only a single cone is illuminated.

It will be appreciated that the cone of acceptance principle also applies to two dimensional arrays of optical fibers. Referring now to FIG. 5, an end view of a two-dimensional array 500 of optical fibers is shown. The spacing between the fibers in a two-dimensional array 501 can be adjusted in concert with the distance from the web to provide the necessary resolution.

Referring now to FIG. 6, the operation of an embodiment of a web edge sensor 600 using a laser in the plane of the web is shown. FIG. 6 also illustrates one possible arrangement of the photodiodes 601 with respect to the fiber optic array 108. The inset 610 illustrates the relation of a single fiber 109 to a single photodiode 601. It can be seen that a single photodiode 601 may correspond to each fiber in the array 108. Each photodiode may detect light from only one fiber such that the position of the web 101 and edge 105 may be ascertained. Thus, the optical fibers in the array 108 may serve to filter the photodiodes from being able to receive any scattered light rays that are not within the critical angle or cone of acceptance.

In one embodiment, the diodes 601 will connect to a common bus 602 to simplify wiring, but individually wiring each photodiode 601 is also possible. The bus 602 may interconnect with a control module 604 via interface 606. The interface 606 may be an analog to digital (A/D) converter or other signal conditioning circuitry. The control module 604 may have an internal A/D converter and may also connect directly to the bus 602. The control module 604 may be a digital controller and may be part of a larger system. The control module 604 may function alone or in combination with other componentry to direct and control web handling operations, as will be described in greater detail below.

The fiber array 108 is spatially positioned such that the plane of fiber array is perpendicular to the plane of longitudinal motion of the web 101, and is parallel to lateral motion of the web. In the present embodiment, the width of the beam 104 may only need to be as wide as the thickness of the web 101 since the beam 104 hit the edge 105 at substantially zero angle. The collimated light source 103 is oriented such that the fiber array receives maximum intensity of scattered light. When the web 101 is in sensing range, one (or a few fibers in a neighboring group) are illuminated. The fibers are illuminated sequentially as the web moves in either direction in the sensor range; the measurement is linear with actual web displacement. The sensors of the present disclosure are therefore able to directly measure displacement, rather than measuring by inference.

By comparing the intensity of light received by each fiber, actual web edge position can be determined. The intensity of light received by each fiber may be measured using a photodiode detector 601 as described. The voltage developed by each photodiode may be proportional to the intensity of light received by the corresponding fiber. The photodiodes 601 may be scanned continuously to determine the photodiode with maximum voltage. The photodiode with the maximum voltage corresponds to a particular position of the web in the sensing window. In some cases, consecutive scans may be used to determine the displacement of the web over time.

In one embodiment, the laser light can operate in the wavelength range of 100 to 1800 nm. However, the spectral range of the light source 103 is not limited as long as a photodiode of similar spectral range is used at the distal end of the fiber array. In some embodiments, the width of the collimated light source can be selected based on the location of the light source with respect to the plane of the web.

Figure 7A:
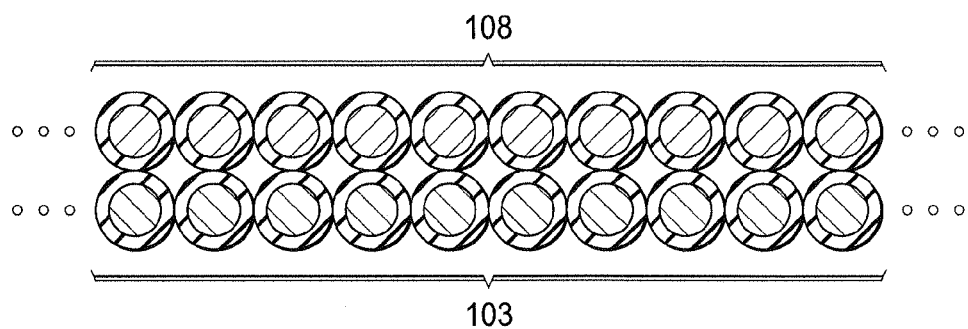
FIG. 7A is an end view of a combined fiber optic light source and fiber optic sensor array.
Figure 7B:
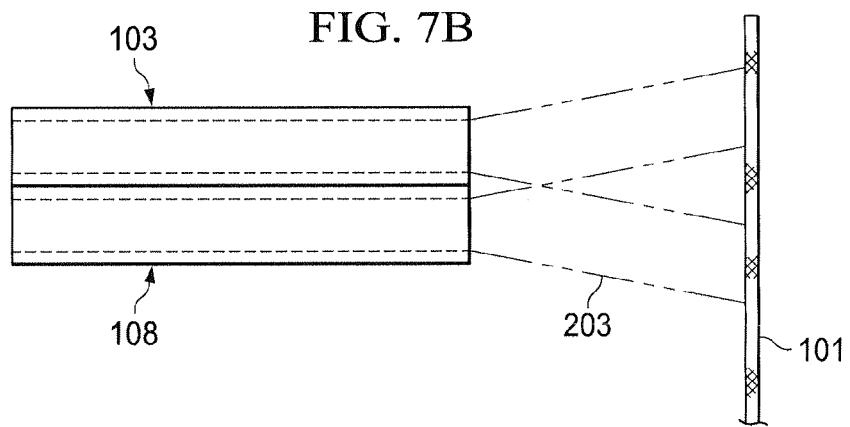
FIG. 7B is a side view of the operation of the sensor array of FIG. 7A.

Referring now to FIGS. 7A-7C, the operation of another embodiment of a web edge sensor according to aspects of the present disclosure is shown. In FIGS. 7A-7C, the light source is placed adjacent to the receiving fiber array as shown in FIGS. 7A-C. The light source may be routed through fiber optics, thus allowing the light source and sensors to effectively operate in very close proximity.

FIG. 7A shows an end view of such a combination arrangement. Here, the top fiber array 108 is used for collecting the scattered light and may be connected on the distal end to photodiodes. The bottom fiber array 103 may be attached to a light or laser and used as the light source.

It can be seen with reference to FIG. 7B that a beam of light emitted by the transmitting fibers 103 and incident on the web 101 scatters light in all directions, including the back scatter direction. The scattered light is picked by the receiving fiber array 108. Hence, all the fibers which are directly below web surface will receive the scattered light, while the fibers which are not below the web surface will receive no scattered light. When the web is completely outside the sensing window, all the photodiodes will have the same voltage level. The photodiodes corresponding to the fibers which are directly below the web surface will have higher voltage levels, when compared to the rest of the photodiodes.

With reference now to FIG. 7C, it can be seen that as the web 101 displaces, the fibers in the sensing array 108 that are receiving light will change. The position of the web 101 can be determined by comparing the voltage levels of the photodiodes. In one embodiment, the transition from low voltage level to high voltage level on the photodiodes indicates the position of the web edge. If the web 101 is completely out of range of the sensing array 108, all photodiodes will have a relatively low voltage level. If the web 101 completely covers the sensor array 108, all the photo diodes will have a same voltage level, but the voltage level will be higher since all the photodiodes receive the scattered light. Hence, a clear distinction between different positions of the web is obtained using the configuration illustrated in FIGS. 7A-7C.

Referring now to FIGS. 8-11, exemplary web handling operations are shown. These are operations making use of the web edge sensors described herein. It will be appreciated that these are merely exemplary applications and the web edge sensors of the present disclosure are not limited to the enumerated exemplary applications.

Lateral control (also called web guiding) involves controlling web fluctuations in the plane of the web and perpendicular to web travel. Web guides are used to maintain the lateral position of the web on rollers during transport. Control of web guides to maintain the lateral position of the web on the rollers prior to coating, printing, winding and other web processes is critical for making a web which is suitable for commercial applications. For example, large lateral movements of the web on rollers can cause slackness of the web, which can result in wrinkles. Hence, monitoring and tight control of the lateral position of the web is essential for manufacturing a quality commercial web material.

Referring now to FIG. 8, a top down view of a center pivot guide roller is shown. Generally, a web guide mechanism may comprise a roller sitting on a pivoted base, whose motion is controlled to change the axis of rotation. A center pivot web guide 802 is rotated around a center pivot 803. In this operation, the web 101 travels across the center pivot web guide 802 and is transported to the next operation. A web edge sensor 800 monitors the position of the web in order to provide feedback to the control system of the web guide 802. A web approaching a guide roller will tend to orient itself perpendicular to the axis of rotation of the roller.

Referring now to FIG. 9, a top down view of an end pivot guide roller is shown. An end pivot web guide 901 is used to alter the direction of travel of the web. The end pivot roller 901 is rotated around an end pivot 902. As in other arrangements of the web guides, a web edge sensor 800 is used to monitor the position of the web in order to provide feedback to the control system of the web guide 901.

Further illustrations of the use of the web sensor are seen in FIGS. 10 and 11. FIG. 10A is a top down view of an offset pivot guide roller, while FIG. 10B is a side view of the offset pivot guide roller. FIGS. 10A-10B illustrate the use of an offset pivot guide roller 1005 to change the direction of a web. In the offset roller guide operation 1005, the web 101 is first wound around a fixed incoming roller 1002 and transported to the offset roller guide 1005. The web is then transported to a fixed exiting roller 1006. The inlet span 1003 is the distance between the incoming roller 1002 and the offset roller guide 1005, and the exit span 1007 is the distance between the offset roller guide 1005 and the exit roller 1006. A web edge sensor 800 provides the necessary measurement of web edge position required for feedback to the controller of the offset pivot guide roller 305.

Figures 11A, 11B:
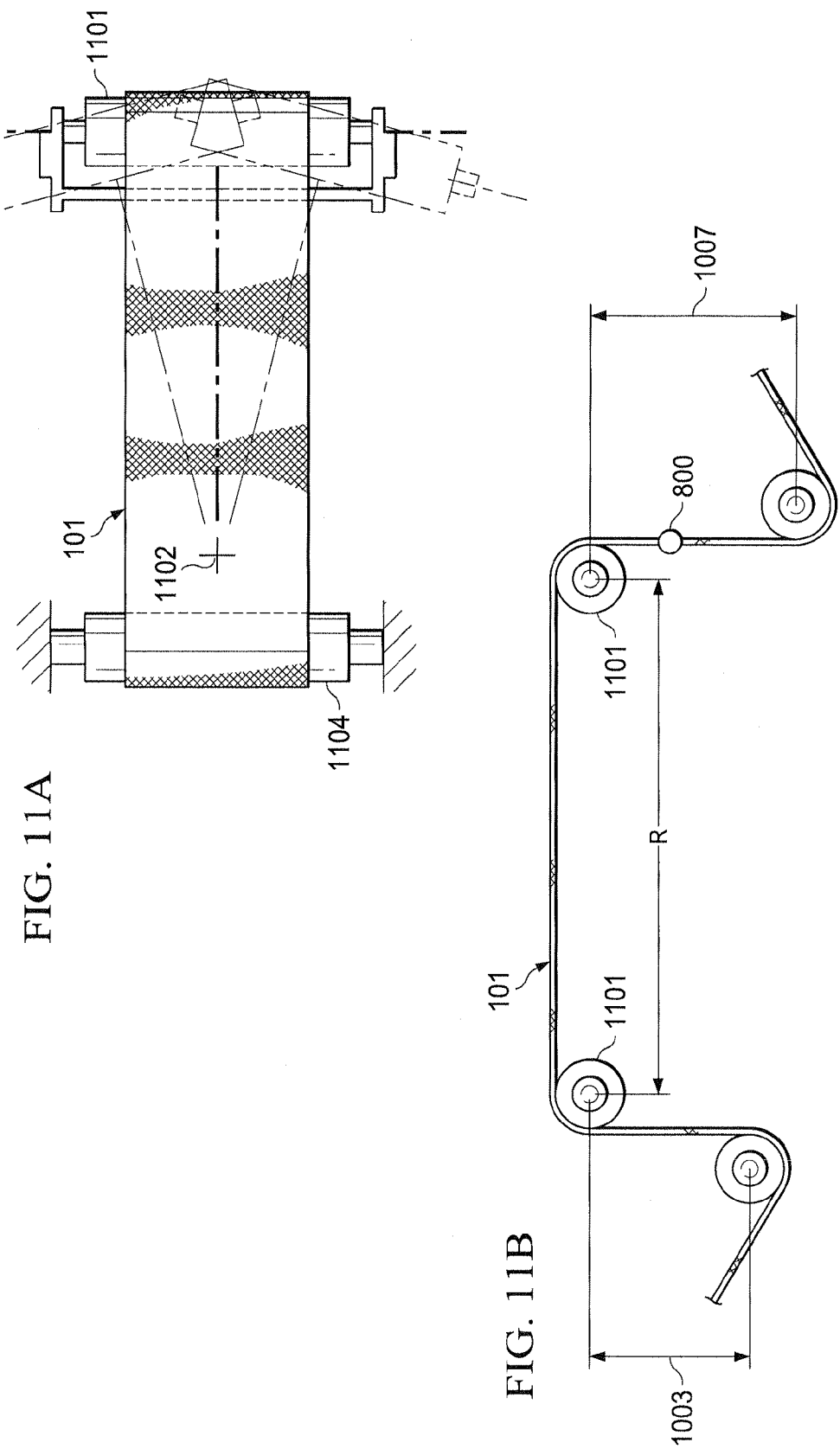
FIG. 11A is a top down view of a remotely pivoted steering guide.
FIG. 11B is a side view of a remotely pivoted steering guide.

Referring now to FIG. 11A, a top down view of a remotely pivoted steering guide is shown while FIG. 11B is a side view of the same remotely pivoted steering guide. Here the remotely pivoted guide roller 1101 pivots about a remote point 1102 to move the web 101 over the distance R between the pivoted guide roller 1101 and a stationary roller 1104. Again, a web edge sensor 800 provides the necessary measurement of web edge position required for feedback to the controller Referring now to FIG. 12, a web edge sensor for detecting a web position in two dimensions is shown. It will be appreciated that any of the previously described web edge sensors may be operable to detect movement of an edge 105 and/or a web 101 across multiple directions or dimensions. For example, a web 101 may displace laterally but may also displace perpendicularly to the plane of motion. This may be referred to as web flutter and it may be important to monitor this effect along with the lateral displacements or perturbations. By aligning the sensor array 108 perpendicularly to the plane of motion (and possibly adjusting the light source), web flutter may be monitored.

Figure 12:
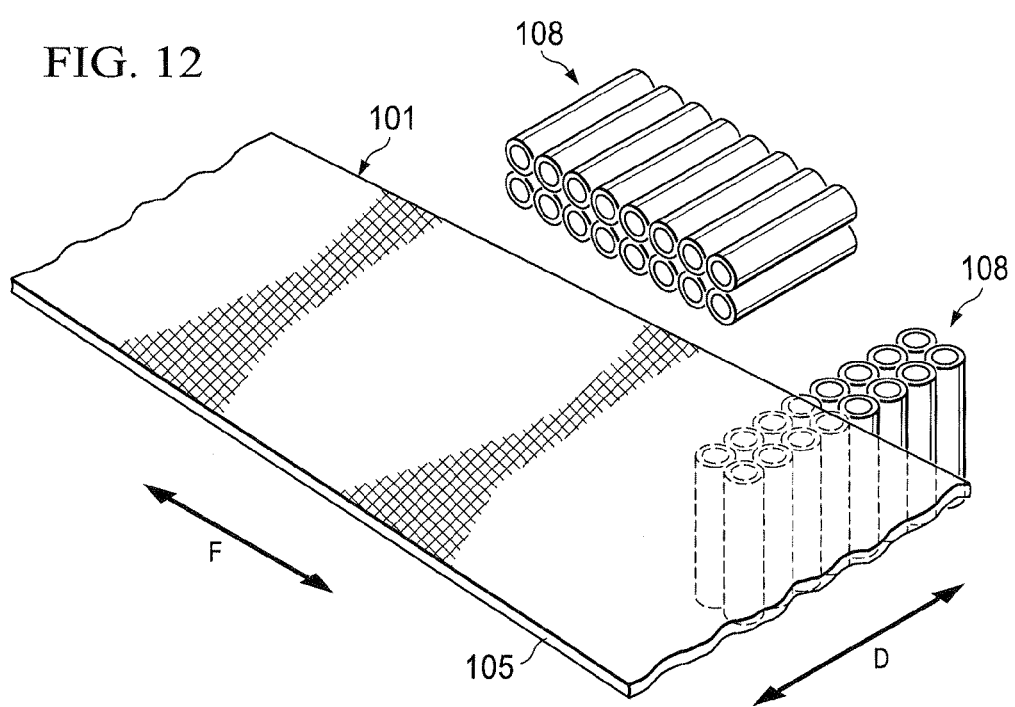
FIG. 12 is a perspective view of a web edge sensor for detecting a web position in two dimensions.

In the embodiment of FIG. 12, flutter and lateral displacement are monitored simultaneously. Possible lateral displacements may be said to occur along the direction D, while web flutter may be said to occur along the direction F. In the present embodiment, there is a sensor array 108 for monitoring each of these perturbations. There may also be one or more light sources (not shown) if they are not incorporated into the sensor array as described with respect to FIGS. 7A-7C. In FIG. 12, two sets of sensor arrays 108 are utilized for monitoring the edge 105 along one side of the web 101. However, it is understood that additional sensors could be placed along the opposite edge of the web 101 or along a different location on the edge 105.

It is to be understood that the invention is not limited in this application to the details of construction and to the arrangements of the components set forth in the present disclosure or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception of the invention, upon which this disclosure is based, may readily be utilized as a basis for the designing of other structures, methods and systems for carrying out the several purposes of the present invention. Additional benefits and advantages of the present invention will be apparent in those skilled in the art to which the present invention relates. It is important, therefore, that the claims be regarded as including such equivalent constructions insofar as they do not depart from the spirit and scope of the present invention.

Further, the purpose of the abstract contained herein is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

What is claimed is:

1. A web edge sensor comprising:
   a web roller guide providing guiding to a web;
   a light source directing light along a first axis and edge-on to an edge of the web, the edge of the web scattering and reflecting the light; and
   a linearly arranged array of fiber optic sensors facing substantially the same direction, each of the fiber optic sensors in the array facing along an axis that is non-parallel to the first axis, where each sensor detects a first portion of the light scattered from the edge of the web and rejects a second portion of the light scattered from the edge of the web to produce a voltage;
   wherein the first portion of the light is incident to the sensor at an angle that is less than a predetermined angle from the normal to the sensor, and the second portion is incident at an angle that is equal to or greater than the predetermined angle; and
   wherein a position of the web is determined based upon a relative difference in voltages produced by the fiber optic sensors.

2. The web edge sensor of claim 1, wherein the sensor array comprises a plurality of fiber optic strands.

3. The web edge sensor of claim 1, wherein the sensor array comprises a plurality of jacketed fiber optic strands.

4. The web edge sensor of claim 1, further comprising a second array of fiber optic sensors facing a second direction.

5. The web edge sensor of claim 1, wherein the sensor array comprises a plurality of photodiodes connected to fiber optic strands.

6. The web edge sensor of claim 1, wherein the sensor array is positioned to detect lateral movement of the web edge.

7. The web edge sensor of claim 1, wherein the sensor array is positioned to detect web flutter.

8. The web edge sensor of claim 1, wherein the sensor array comprises at least two fiber optic arrays to detect movement of the web in at least two dimensions.

9. A web edge detector comprising:
   a web guide roller providing positioning of a web;
   a collimated light source that illuminates an area proximate an edge of the web;
   a plurality of means for detecting a portion of light from the collimated light source scattered by the edge of the web and producing an associated voltage; and
   means for determining a position of the web edge based on a relatively largest voltage from the associated voltages produced by the plurality of means for detecting;
   wherein the detected light is primarily scattered light and incident to the means for determining within a limited, predetermined angle of incidence relative to the means for detecting; and
   wherein the collimated light source is emitted a long an axis that is non-parallel to the normal angle from each of the means for detecting a portion of light.

10. The web edge detector of claim 9, wherein the means for detecting comprises a plurality of fiber optic strands.

11. The web edge detector of claim 9, wherein the means for detecting comprises an array of jacketed fiber optic strands.

12. The web edge detector of claim 9, wherein the means for detecting comprises a linear array of jacked fiber optic strands.

13. The web edge detector of claim 9, wherein the means for detecting comprise a two-dimensional array of jacketed fiber optic strands.

14. The web edge detector of claim 9, wherein the collimated light source is a laser.

15. The web edge detector of claim 9, wherein the means for detecting comprises a plurality of fiber optic strands each connected to a photodiode.

16. The web edge detector of claim 9, wherein the means for detecting is a means for detecting lateral movement of the web.

17. The web edge detector of claim 9, wherein the means for detecting is a means for detecting web flutter.

18. A method of monitoring the location of a web, the method comprising:
   guiding the web on an end pivoting web roller guide near a collimated laser light source;
   directing the collimated laser light source along a first axis and thereby illuminating an edge of the web resulting in scattered and reflected light;
   detecting scattered light from the edge of the web with a plurality of photodiodes, each photodiode connected to a jacketed fiber optic strand positioned to collect the scattered light from the vicinity of the edge of the web and produce an associated voltage;
   arranging the fiber optic strands facing substantially the same direction where each strand detects light only within a limited angle of incidence relative to the normal angle to the strand and the normal angle of each strand is non-parallel to the first axis; and
   determining the location of the web based on the relative difference in voltages among the voltages produced by the photodiodes.

* * * * *